US012606126B2

(12) United States Patent
Shin et al.

(10) Patent No.: US 12,606,126 B2
(45) Date of Patent: Apr. 21, 2026

(54) DEVICE AND METHOD FOR CONTROLLING VEHICLE BY RECOGNIZING DIGITAL KEY

(71) Applicants:Hyundai Motor Company, Seoul (KR); Kia Corporation, Seoul (KR)

(72) Inventors: Yong Ho Shin, Gyeonggi-do (KR); Jeong Min Kim, Gyeonggi-do (KR); Seok Gyu Kim, Gyeonggi-do (KR); Jeong Gi Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 92 days.

(21) Appl. No.: 18/387,330

(22) Filed: Nov. 6, 2023

(65) Prior Publication Data

US 2024/0416868 A1 Dec. 19, 2024

(30) Foreign Application Priority Data

Jun. 16, 2023 (KR) ........................ 10-2023-0077648

(51) Int. Cl.
*B60R 25/24* (2013.01)

(52) U.S. Cl.
CPC ...... *B60R 25/245* (2013.01); *B60R 2325/101* (2013.01)

(58) Field of Classification Search
CPC ........................ B60R 25/245; B60R 2325/101
See application file for complete search history.

(56) References Cited

U.S. PATENT DOCUMENTS

| | | | | |
|---|---|---|---|---|
| 9,358,940 B2 * | 6/2016 | Cooper | ................. | H04L 63/107 |
| 10,083,555 B2 * | 9/2018 | Woo | ..................... | H04B 17/318 |
| 11,493,348 B2 * | 11/2022 | Levy | .................. | G01C 21/3461 |
| 2019/0162862 A1 * | 5/2019 | Lin | ......................... | G08G 1/123 |
| 2020/0384951 A1 * | 12/2020 | Preradovic | ............ | B60R 25/245 |
| 2021/0264691 A1 * | 8/2021 | Hirao | .................. | H04W 64/006 |
| 2022/0388477 A1 * | 12/2022 | Lee | ...................... | H01Q 1/3241 |
| 2023/0102693 A1 * | 3/2023 | Fuke | ..................... | B60R 25/245 |
| | | | | 340/5.52 |
| 2023/0334922 A1 * | 10/2023 | Lim | ................... | G07C 9/00309 |

* cited by examiner

*Primary Examiner* — Thomas D Alunkal
(74) *Attorney, Agent, or Firm* — Fox Rothschild LLP

(57) ABSTRACT

A device for controlling a vehicle includes a communication circuit, a processor, and a memory, and the processor recognizes a trigger event for recognizing an external digital key corresponding to the vehicle, establishes wireless communication with a plurality of external terminals including the external digital key via the communication circuit using a first communication protocol, recognizes a received signal strength for each of the plurality of external terminals via the wireless communication, determines respective priorities of the plurality of external terminals based on the received signal strengths, and monitors a location of at least one of the plurality of external terminals based on the respective priorities using a second communication protocol via the communication circuit.

16 Claims, 5 Drawing Sheets

100

| COMMUNICATION CIRCUIT 110 | PROCESSOR 130 | MEMORY 120 |

FIG.1

DEVICE AND METHOD FOR CONTROLLING VEHICLE BY RECOGNIZING DIGITAL KEY

CROSS-REFERENCE TO RELATED APPLICATION

This application claims under 35 U.S.C. § 119 (a) the benefit of Korean Patent Application No. 10-2023-0077648, filed in the Korean Intellectual Property Office on Jun. 16, 2023, the entire contents of which are incorporated herein by reference.

BACKGROUND

(a) Technical Field

The present disclosure relates to a device and method for controlling a vehicle, more particularly, to the device and method for recognizing a digital key and monitoring a location of the digital key outside the vehicle.

(b) Description of the Related Art

With the development of vehicle technology, a vehicle typically provides various features for convenience of a user in addition to functioning as a basic mode of transportation. One of these features is a smart key system that supports functions such as automatic opening and closing of a vehicle door and start-up. In addition, a digital key system that stores a digital key in a terminal and uses the terminal like a smart key of the vehicle has been utilized. For example, the digital key system refers to a system that may control an operation or function of the vehicle without directly inserting a physical key into a key groove of the vehicle door when the user holding the digital key is located near the vehicle.

To use the digital key system, the vehicle must be able to recognize a location of the external digital key. However, when there are a plurality of external digital keys, it may not be possible to simultaneously measure locations of the plurality of digital keys. In this case, when a location measurement of a digital key that does not match an intention of the user is performed first, a delay may occur in a vehicle control operation.

SUMMARY

An aspect of the present disclosure provides a device for controlling a vehicle and a method for recognizing a digital key thereof that may set respective priorities for a plurality of digital keys and monitor locations of the digital keys based on the respective priorities.

Another aspect of the present disclosure provides a device for controlling a vehicle and a method for recognizing a digital key thereof that may reduce a delay of a vehicle control operation by determining respective priorities for a plurality of digital keys depending on a circumference and monitoring locations thereof.

Another aspect of the present disclosure provides a device for controlling a vehicle and a method for recognizing a digital key thereof that may monitor locations of digital keys starting from a digital key likely to be used for the vehicle control.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a vehicle includes a communication circuit, a processor, and a memory. The processor recognizes a trigger event for recognizing an external digital key corresponding to the vehicle, establishes wireless communication with a plurality of external terminals including the external digital key via the communication circuit using a first communication protocol, recognizes a received signal strength for each of the plurality of external terminals via the wireless communication, determines respective priorities of the plurality of external terminals based on the received signal strengths, and monitors a location of at least one of the plurality of external terminals based on the respective priorities using a second communication protocol via the communication circuit.

In one implementation, the first communication protocol may include Bluetooth or Bluetooth low energy (BLE), and the second communication protocol may include ultra-wideband (UWB).

In one implementation, the processor may determine a relative distance of each of the plurality of external terminals to the vehicle based on the received signal strengths, and set the respective priorities in an ascending order of the relative distances of the plurality of external terminals to the vehicle.

In one implementation, the trigger event may include at least one specified user manipulation of the vehicle.

In one implementation, the specified user manipulation may include at least one of a user's manipulation of a handle of at least one door of the vehicle, a manipulation related to a trunk of the vehicle, or an opening/closing manipulation of at least one door of the vehicle.

In one implementation, the processor may recognize a location where the trigger event has occurred, and assign a weight to the received signal strength for each of the plurality of external terminals based on a distance between each of the plurality of external terminals and the location where the trigger event has occurred.

In one implementation, the communication circuit may include a first communication module and a second communication module at different locations of the vehicle, the first communication module and the second communication modules may have predetermined cover areas covering at least portions of the vehicle, and the processor may recognize a communication module located at a location closer to a location where the trigger event has occurred among the first communication module and the second communication module, and assign a weight to a received signal strength of a terminal existing in a cover area corresponding to the communication module at the closer location.

In one implementation, the weight may be set to a different value for each type of vehicle.

In one implementation, the processor may receive a control signal related to the vehicle from at least one of the plurality of external terminals using the first communication protocol, and control the vehicle to perform a specified operation based on the control signal.

In one implementation, the processor may receive a request for recognizing the digital key from a first terminal among the plurality of external terminals, and set a priority of the first terminal to a highest priority in response to the request.

A vehicle may include the above-described device.

According to another aspect of the present disclosure, a method for recognizing a digital key of a vehicle control device includes recognizing a trigger event for recognizing an external digital key corresponding to the vehicle, establishing wireless communication with a plurality of external terminals including the external digital key using a first communication protocol, recognizing a received signal strength for each of the plurality of external terminals via the wireless communication, determining respective priorities of the plurality of external terminals based on the received signal strengths, and monitoring a location of at least one of the plurality of external terminals based on the respective priorities using a second communication protocol.

In one implementation, the first communication protocol may include Bluetooth or Bluetooth low energy (BLE), and the second communication protocol may include ultra-wideband (UWB).

In one implementation, the determining of the respective priorities may include determining a relative distance of each of the plurality of external terminals to the vehicle based on the received signal strength, and setting the respective priorities in an ascending order of the relative distances of the plurality of external terminals to the vehicle.

In one implementation, the trigger event may include at least one specified user manipulation of the vehicle.

In one implementation, the specified user manipulation may include at least one of a user's manipulation of a handle of at least one door of the vehicle, a manipulation related to a trunk of the vehicle, or an opening/closing manipulation of at least one door of the vehicle.

In one implementation, the determining of the respective priorities may include recognizing a location where the trigger event has occurred, and assigning a weight to the received signal strength for each of the plurality of external terminals based on a distance between each of the plurality of external terminals and the location where the trigger event has occurred.

In one implementation, the determining of the respective priorities may include recognizing a communication module located at a location closer to a location where the trigger event has occurred among a first communication module and a second communication module located at different locations of the vehicle and respectively having predetermined cover areas covering at least portions of the vehicle, and assigning a weight to a received signal strength of a terminal existing in a cover area corresponding to the communication module at the closer location.

In one implementation, the weight may be set to a different value for each type of vehicle.

In one implementation, the method may further include receiving a control signal related to the vehicle from at least one of the plurality of external terminals using the first communication protocol, and controlling the vehicle to perform a specified operation based on the control signal.

In one implementation, the method may further include receiving a request for recognizing the digital key from a first terminal among the plurality of external terminals, and setting a priority of the first terminal to a highest priority in response to the request.

BRIEF DESCRIPTION OF THE DRAWINGS

The above and other objects, features and advantages of the present disclosure will be more apparent from the following detailed description taken in conjunction with the accompanying drawings:

FIG. 1 is a block diagram of a vehicle control device according to an embodiment of the present disclosure;

DETAILED DESCRIPTION

Figure 2:
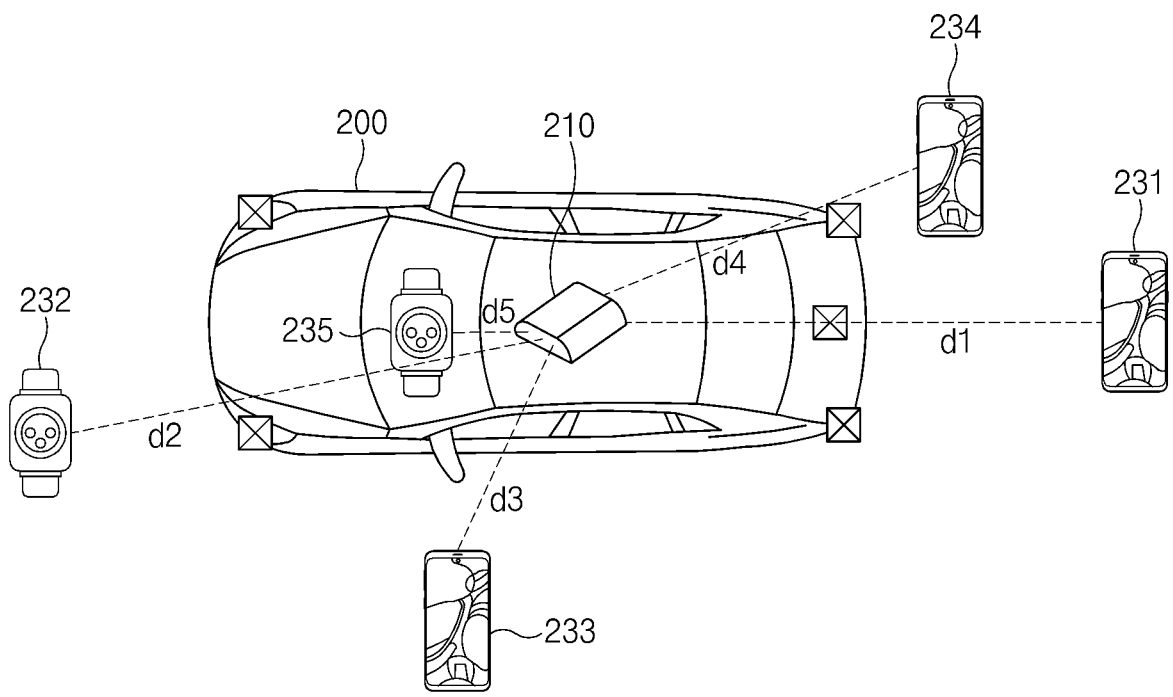
FIG. 2 is a diagram for illustrating an operation of a vehicle control device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
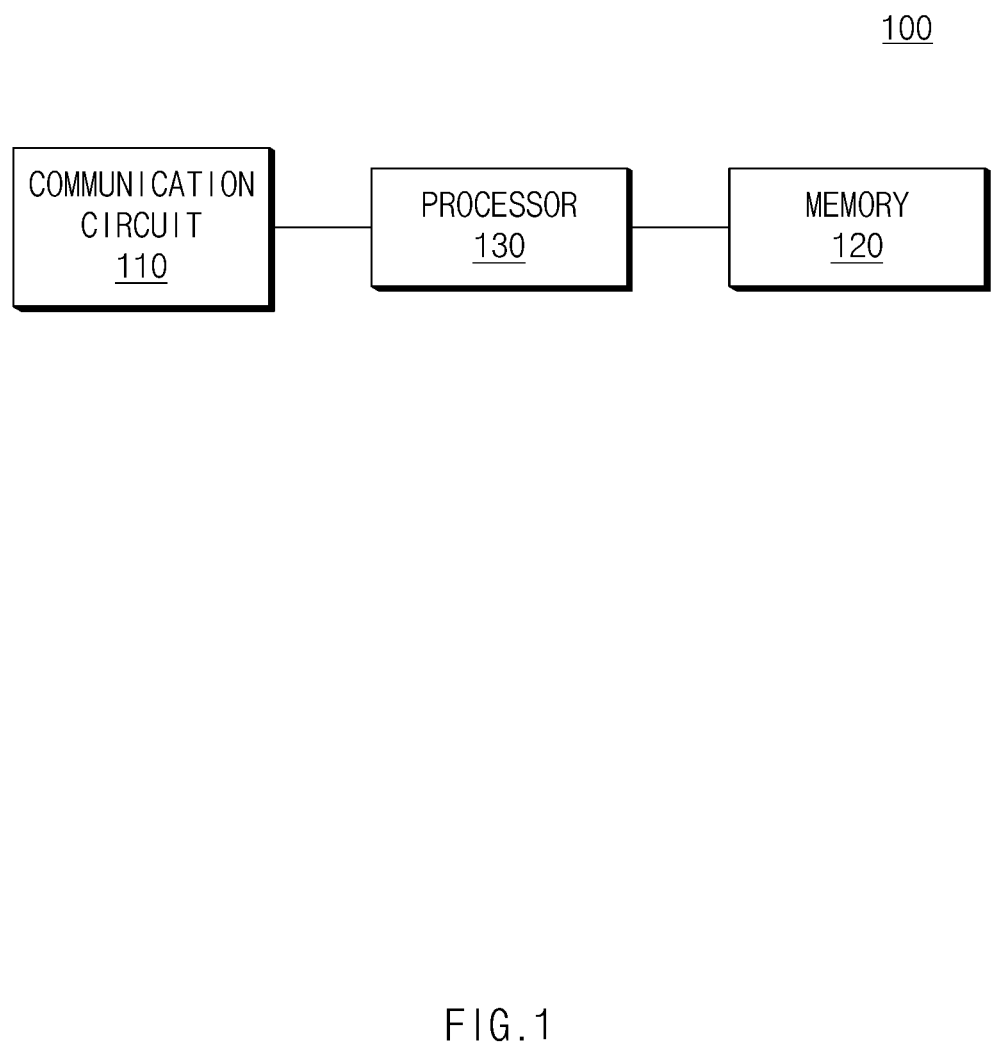

Hereinafter, embodiments of the present disclosure will be described in detail with reference to FIGS. 1 to 5.

FIG. 1 is a block diagram of a vehicle control device according to an embodiment of the present disclosure.

Referring to FIG. 1, a vehicle control device 100 according to one embodiment of the present disclosure may be implemented inside a vehicle. In this regard, the vehicle control device 100 may be integrally formed with internal control units of the vehicle, or may be implemented as a separate device and connected to the control units of the vehicle by separate connection means.

According to one embodiment, the vehicle control device 100 may include a communication circuit 110, a memory 120, and a processor 130.

According to one embodiment, the communication circuit 110 may transmit and receive information and/or data with an external device (e.g., an external terminal). For example, the external device may include a terminal (e.g., a smart phone or a smart watch) including a digital key. For example, a program or an application that may execute an operation as the digital key corresponding to the vehicle may be installed in the external terminal. For example, the external terminal may perform a procedure of authenticating a user (a driver) to function as the digital key, and may provide functions of the digital key when the user authentication succeeds. For example, the functions of the digital key may include vehicle-related functions or operation control including locking/unlocking the vehicle (e.g., a door of the vehicle), opening the door or a trunk of the vehicle, turning on/off the vehicle, controlling a window, a passive entry function of allowing the user to enter the vehicle without a control signal, or a function of controlling the internal control unit mounted in the vehicle.

For example, the communication circuit 110 may receive a control command for controlling the vehicle from the external device. The communication circuit 110 may transmit vehicle-related information to the external device. The communication circuit 110 may transmit/receive a specified signal with the external device. According to one embodiment, the communication circuit 110 may support a plurality of communication protocols. For example, the plurality of communication protocols may include Bluetooth, Bluetooth low energy (BLE), and/or ultra wide band (UWB). According to one embodiment, the communication circuit 110 may include a plurality of communication modules. For example, the communication circuit 110 may include at least one communication module that supports a first communication protocol (e.g., the BLE) and/or at least one communication module that supports a second communication protocol (e.g., the UWB). According to one embodiment, when the communication circuit 110 includes the plurality of communication modules, each communication module may be disposed at a different location of the vehicle. According to one embodiment, the communication circuit 110 may transmit/receive signals including different types of information and/or data with the external device using the plurality of communication protocols. For example, the communication circuit 110 may transmit and receive a signal for controlling operations of the external device and the vehicle using the first communication protocol (e.g., the BLE), and transmit and receive a signal for monitoring a location of the external device using the second communication protocol (e.g., the UWB).

According to one embodiment, the communication circuit 110 may include at least one of a mobile communication module, a wireless Internet module, or a short-distance communication module. The mobile communication module may be in communication with the external device via a mobile communication network built based on technical standards or communication schemes for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), and long term evolution-advanced (LTE-A)).

The wireless Internet module is a module for wireless Internet access, and is able to be in communication with the external device via wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

According to one embodiment, the memory 120 may store instructions executed by the processor 130. According to one embodiment, the instructions, when executed by the processor 130, may control the operation of the vehicle control device 100. According to one embodiment, the memory 120 may store information and/or data related to the operation of the vehicle control device 100. For example, the memory 120 may store information and/or data used to perform a digital key recognition method. The memory 120 may include at least one of storage media such as a flash memory, a hard disk, a solid state disk (SSD), a secure digital card (SD card), an embedded multimedia card (eMMC), a universal flash storage (UFS), a removable disk and/or web storage, or storage media such as a random access memory (RAM), a static random access memory (SRAM), a read only memory (ROM), a programmable read only memory (PROM), an electrically erasable and programmable ROM (EEPROM), and/or an erasable and programmable ROM (EPROM).

According to one embodiment, the processor 130 may recognize a trigger event for recognizing the external digital key corresponding to the vehicle. According to one embodiment, the trigger event may include at least one specified user manipulation of the vehicle. For example, the specified user manipulation may include at least one of a user's manipulation of a handle of at least one of the doors of the vehicle, a manipulation related to the trunk of the vehicle (e.g., an input to a button to open the trunk), or a manipulation of opening/closing at least one of the doors of the vehicle (e.g., opening or closing the vehicle door). According to various embodiments, the trigger event may not be limited to those listed above and may be variously specified as at least one of user's manipulations related to the vehicle. According to one embodiment, the processor 130 may additionally perform an authentication procedure on the external terminals including the digital keys in response to the trigger event. For example, the processor 130 may measure locations of the terminals and allow the terminals to provide the function as the digital key when the authentication of the terminals succeeds.

According to one embodiment, the processor 130 may recognize an external terminal existing within a specified distance from the vehicle using the first communication protocol. For example, the processor 130 may transmit and receive a signal for communication establishment with at least one external terminal using the first communication protocol via the communication circuit 110. According to one embodiment, each of the external terminals may include the digital key corresponding to the vehicle. For example, the external terminal may receive the digital key corresponding to the vehicle from the outside via the user authentication and/or a vehicle authentication. The digital key may perform a function of a smart key of the vehicle. For example, the digital key may turn on or turn off the vehicle, control the door or the window of the vehicle, or control functions supported by the vehicle.

According to one embodiment, the processor 130 may recognize a received signal strength for each of the plurality of external terminals. For example, the processor 130 may measure a received signal strength indicator (RSSI) for each of the plurality of external terminals.

According to one embodiment, the processor 130 may determine respective priorities of the plurality of external terminals based on the received signal strengths. For example, the processor 130 may determine the respective priorities of the external terminals in a descending order of the received signal strengths. For example, the processor 130 may determine a relative distance of each of the plurality of external terminals to the vehicle based on the received signal strength. The processor 130 may set the respective priorities in an ascending order of the relative distances of the plurality of external terminals to the vehicle.

According to one embodiment, the processor 130 may receive a request for the digital key recognition from one of the plurality of external terminals. For example, in response to the request, the processor 130 may set the highest priority to the terminal that has sent the request. For example, when a specific terminal first transmits the request to the vehicle control device 100, the processor 130 may determine that the user has an intention to control the vehicle using a digital key included in the corresponding terminal. For example, when receiving a signal including a ranging intent from a terminal including a specific digital key, the processor 130 may set the highest priority to the corresponding terminal.

According to one embodiment, the processor 130 may recognize a location where the trigger event has occurred. The processor 130 may assign a weight to the received signal strength for each of the plurality of external terminals based on a distance between each of the plurality of external terminals and the location where the trigger event has occurred. For example, as a distance between the location where the trigger event has occurred and a terminal is smaller, the processor 130 may assign a higher weight to a received signal strength for the corresponding terminal. For example, when a trigger event of pressing the trunk open button of the vehicle occurs, the processor 130 may assign a higher weight to a terminal located close to the trunk of the vehicle. As another example, when a trigger event of pressing a driver's seat door button of the vehicle occurs, the processor 130 may assign a higher weight to a terminal located close to the driver's seat door of the vehicle. According to various embodiments, a weight value based on a distance may be preset or specified by a user input.

According to one embodiment, when the communication circuit 110 includes a first communication module and a second communication module disposed at different locations of the vehicle and respectively having predetermined cover areas containing at least portions of the vehicle, the processor 130 may recognize a communication module located closer to the location where the trigger event has occurred. The processor 130 may assign a weight to a received signal strength value of at least one terminal existing in a cover area corresponding to the communication module located closer to the location where the trigger event has occurred. According to various embodiments, a weight value based on a cover area may be preset or specified by a user input, and may be set to a different value for each type of vehicle. According to one embodiment, the processor 130 may recognize a distance between the communication module located closer to the location where the trigger event has occurred and each of the plurality of external terminals, and assign weights to received signal strengths of at least some of the external terminals based on the distance between the communication module located closer to the location where the trigger event has occurred and each of the external terminals. According to one embodiment, the processor 130 may determine the respective priorities of the external terminals based on the received signal strength values of the respective external terminals to which the weights are assigned.

According to one embodiment, the processor 130 may monitor a location of at least one of the plurality of external terminals based on the respective priorities using the second communication protocol. For example, the processor 130 may measure the locations of all or at least one of the plurality of external terminals in real time based on the determined respective priorities. For example, the second communication protocol may include the ultra wide band (UWB). For example, the processor 130 may measure (e.g., perform ranging or localizing) the location of the at least one external terminal in real time via the UWB. For example, as the vehicle control device 100 measures the location of the external terminal including the digital key in real time, passive control of the vehicle via the digital key may be possible. For example, the passive control may mean a function of allowing the vehicle to determine the location of the key and perform a specified operation depending on a circumference even when the user does not directly manipulate the key of the vehicle (e.g., the terminal including smart key and/or the digital key).

According to one embodiment, the processor 130 may receive a control signal related to the vehicle from the external terminal at least partially based on the monitored location of the terminal. For example, the control signal may include a command for controlling the function or the operation of the vehicle. The processor 130 may control the vehicle to perform the specified operation or function corresponding to the control signal based on the control signal. According to one embodiment, the vehicle control device may perform the specified function without a user's manipulation based on the location of the external terminal including the digital key or control the operation of the vehicle. According to one embodiment, the vehicle control device may determine whether the user is inside or near the vehicle based on the location of the digital key, and perform the operation to control the vehicle based on a location of the user. According to one embodiment, the processor 130 may receive the control signal related to the vehicle from the external terminal via the first communication protocol (e.g., the BLE), and simultaneously, monitor the location of the external terminal via the second communication protocol (e.g., the UWB).

According to one embodiment, the vehicle control device 100 may determine the respective priorities for the plurality of external terminals depending on a circumference, and monitor the locations of the external terminals based on the respective priorities, thereby efficiently monitoring the locations of the external terminals depending on the circumference and reducing a delay that occurs when controlling the vehicle using the digital key.

FIG. 2 is a diagram for illustrating an operation of a vehicle control device according to an embodiment of the present disclosure.

According to one embodiment, the vehicle control device may be implemented inside a vehicle 200. The vehicle control device may be integrally formed with internal control units of the vehicle 200, or may be implemented as a separate device and connected to the control units of the vehicle 200 by separate connection means. For example, the vehicle control device may include a communication circuit 210. The communication circuit 210 may be in communication with the external terminal including the digital key using the first communication protocol (e.g., the BLE) and/or the second communication protocol (e.g., the UWB). FIG. 2 shows that the communication circuit 210 is disposed at a center of the vehicle 200, but according to various embodiments, the location of the communication circuit 210 is not limited thereto. According to one embodiment, each of external terminals 231, 232, 233, 234, and 235 may include a digital key corresponding to the vehicle 200. In FIG. 2, the five external terminals 231, 232, 233, 234, and 235 (e.g., the first terminal 231, the second terminal 232, the third terminal 233, the fourth terminal 234, and the fifth terminal 235) are shown, but, according to various embodiments, the number of external terminals 231, 232, 233, 234, and 235 is not limited thereto, and the vehicle 200 is able to be controlled via the digital key of at least one external terminal.

According to one embodiment, the vehicle control device may recognize the trigger event for the digital key recognition. For example, the trigger event may include the user's manipulation of the door's handle of the vehicle 200, pressing the trunk open button, steering wheel manipulation, turning on the vehicle, or sensing the user (the user's terminal) around the vehicle 200, but may not be limited thereto. According to one embodiment, the vehicle control device may measure (e.g., perform the ranging or localizing) locations of the external terminals 231, 232, 233, 234, and 235 for the digital key recognition in response to the recognition of the trigger event.

According to one embodiment, the vehicle control device may establish communication with the plurality of external terminals 231, 232, 233, 234, and 235 using the first communication protocol. For example, the vehicle control device may recognize a received signal strength (e.g., an RSSI value) for each of the external terminals 231, 232, 233, 234, and 235 based on signals received from the plurality of external terminals 231, 232, 233, 234, and 235. According to one embodiment, the vehicle control device may determine respective priorities for the plurality of external terminals 231, 232, 233, 234, and 235 based on the received signal strengths. For example, the received signal strength may increase as the external terminal is closer to the vehicle control device (e.g., the communication circuit 210). The vehicle control device may determine the respective priorities of the external terminals 231, 232, 233, 234, and 235 in a descending order of the received signal strengths. For example, the vehicle control device may determine a relative distance between each of the plurality of external terminals 231, 232, 233, 234, and 235 and the vehicle 200 (e.g., the vehicle control device) based on the received signal strength. The vehicle control device may determine the respective priorities of the external terminals 231, 232, 233, 234, and 235 in an ascending order of the relative distances of the plurality of external terminals 231, 232, 233, 234, and 235 with the vehicle 200 (e.g., the vehicle control device).

Referring to FIG. 2, when an ascending order of the distances between the vehicle control device (e.g., the communication circuit 210) and the plurality of external terminals 231, 232, 233, 234, and 235 is d5, d3, d4, d2, and d1, the received signal strengths may descend in an order of the received signal strength for the fifth terminal 235, the received signal strength for the third terminal 233, the received signal strength for the fourth terminal 234, the received signal strength for the second terminal 232, and the received signal strength for the first terminal 231. In this case, the vehicle control device may determine the respective priorities of the plurality of terminals in an order of the fifth terminal 235, the third terminal 233, the fourth terminal 234, the second terminal 232, and the first terminal 231.

According to one embodiment, the vehicle control device may monitor the location of at least one of the plurality of terminals based on the respective priorities using the second communication protocol (e.g., the UWB). For example, the vehicle control device may monitor the locations of the external terminals 231, 232, 233, 234, and 235 in an order of the fifth terminal 235, the third terminal 233, the fourth terminal 234, the second terminal 232, and the first terminal 231. For example, the vehicle control device may measure the locations of the external terminals 231, 232, 233, 234, and 235 in real time for a passive control operation of the vehicle 200. For example, the vehicle control device may track changes in the locations of the external terminals 231, 232, 233, 234, and 235.

According to one embodiment, when the vehicle control device recognizes the trigger event, it may be a case that a user inside the vehicle 200 or near the vehicle 200 has performed an action of controlling (manipulating) the vehicle 200. In this case, when attempting to measure a location of a terminal that is far from the vehicle 200 (which is highly likely to be a terminal that does not attempt to control the vehicle 200), a delay may occur in an operation of controlling the vehicle 200 by a terminal that is close to the vehicle 200 (that is, a terminal that has attempted to control the vehicle 200). Therefore, as the respective priorities of the external terminals 231, 232, 233, 234, and 235 are determined based on the received signal strengths (or the relative distances to the vehicle 200), a delay of an operation of controlling the vehicle 200 by at least one of the external terminals 231, 232, 233, 234, and 235 may be reduced.

Figure 3:
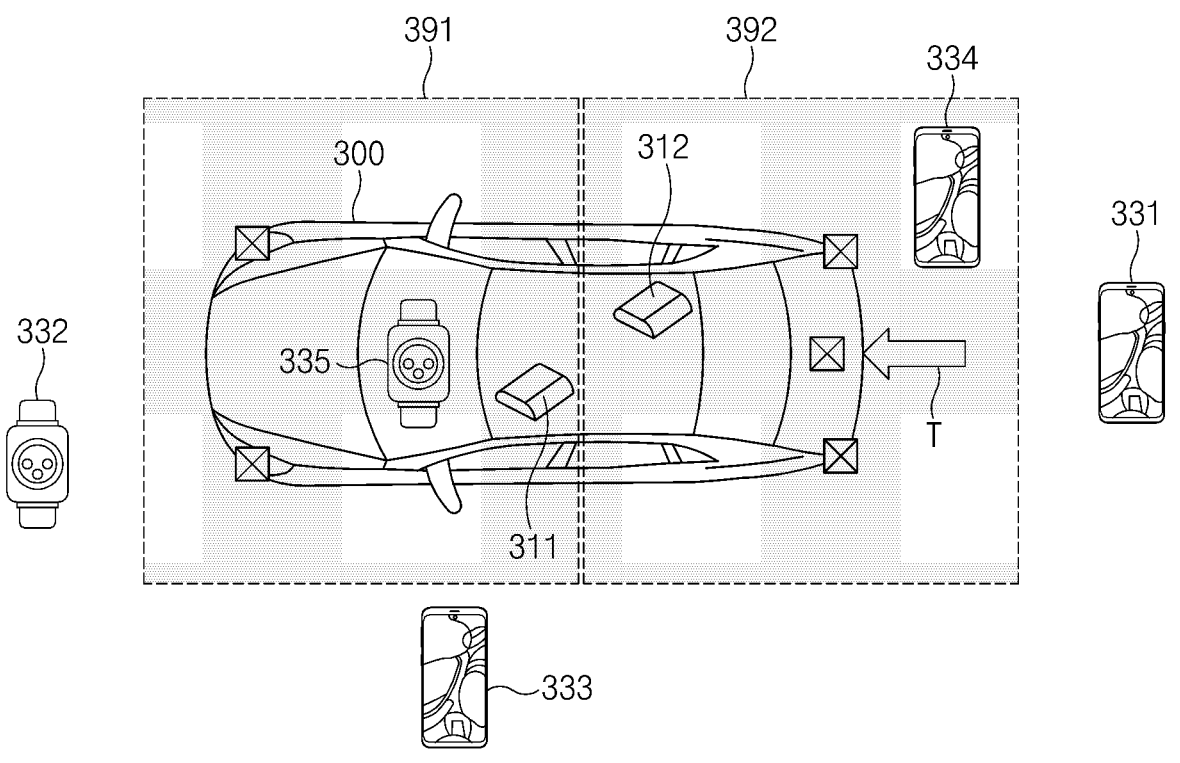
FIG. 3 is a diagram for illustrating an operation of a vehicle control device according to an embodiment of the present disclosure.

FIG. 3 is a diagram for illustrating an operation of a vehicle control device according to an embodiment of the present disclosure.

According to one embodiment, the communication circuit of the vehicle control device may include a first communication module 311 and a second communication module 312. In FIG. 3, only the two communication modules are shown, but the present disclosure may not be limited thereto, and the communication circuit may include a plurality of communication modules. According to one embodiment, the first communication module 311 and the second communication module 312 may be disposed at different locations inside a vehicle 300, the first communication module 311 may have a first cover area 391, and the second communication module 312 may have a second cover area 392. Although FIG. 3 shows that the first cover area 391 and the second cover area 392 have the same magnitude and do not overlap each other, the first cover area 391 and the second cover area 392 may at least partially overlap each other and may have different magnitudes.

According to one embodiment, the vehicle control device may recognize a trigger event 'T' for the digital key recognition. For example, the vehicle control device may recognize the input 'T' to a trunk open button of the vehicle 300.

According to one embodiment, the vehicle control device may establish communication using the first communication protocol via a communication module relatively close to a plurality of external terminals. For example, the vehicle control device may establish communication with a second terminal 332, a third terminal 333, and a fifth terminal 335 via the first communication module 311, and establish communication with a first terminal 331 and a fourth terminal 334 via the second communication module. For example, the vehicle control device may recognize received signal strengths of the external terminals via the first communication module 311 and the second communication module 312. According to one embodiment, the vehicle control device may recognize a communication module (e.g., the second communication module 312) located at a location closer to a location where the trigger event 'T' has occurred.

According to one embodiment, the vehicle control device may assign weights to the received signal strengths of the external terminals based on distances between the recognized communication module and the external terminals. Referring to FIG. 3, the vehicle control device may assign a weight to the received signal strength of the fourth terminal 334 located in the second cover area 392 of the second communication module 312 adjacent to a trunk where the trigger event 'T' has occurred. According to one embodiment, the vehicle control device may set a weight value assigned to the received signal strength based on a type of vehicle 300. For example, the first terminal 331 may be closer to the location where the trigger event 'T' has occurred (or the location of the second communication module 312) than the third terminal 333 or the fifth terminal 335, but may have a relative distance to the vehicle 300 greater than that of the third terminal 333 or the fifth terminal 335. In this case, the vehicle control device may set weight values assigned to the plurality of terminals 331, 332, 333, 334, and 335 that are applied such that the third terminal 333 or the fifth terminal 335 having the distance to the vehicle 300 smaller than that of the first terminal 331 has a higher priority.

According to one embodiment, the vehicle control device may determine respective priorities of the plurality of terminals 331, 332, 333, 334, and 335 based on the weight values assigned to the received signal strengths of the plurality of terminals 331, 332, 333, 334, and 335. For example, when the vehicle control device determines the respective priorities based on the received signal strengths of the plurality of terminals 331, 332, 333, 334, and 335 without assigning the weights, the respective priorities may be determined in an order of the fifth terminal 335, the third terminal 333, the fourth terminal 334, the second terminal 332, and the first terminal 331 that is an ascending order of a distance to the first communication module 311 or the second communication module 312. As another example, when the vehicle control device determines the respective priorities by applying the weights in consideration of the location where the trigger event 'T' has occurred, the weight may be applied to the received signal strength of the fourth terminal 334 adjacent to the trunk where the trigger event 'T' has occurred, and the respective priorities may be determined in an order of the fourth terminal 334, the fifth terminal 335, the third terminal 333, the second terminal 332, and the first terminal 331.

According to one embodiment, the vehicle control device may monitor locations of the plurality of terminals 331, 332, 333, 334, and 335 using the second communication protocol (e.g., the UWB) based on the respective priorities. According to one embodiment, because the trigger event 'T' includes a user's manipulation of the vehicle 300, when the respective priorities of the plurality of terminals 331, 332, 333, 334, and 335 are determined in consideration of the location where the trigger event 'T' has occurred, the vehicle control device may determine a high priority for a terminal that is likely to be used for controlling the vehicle 300 and preferentially measure a location of the corresponding terminal to reduce a delay in controlling the vehicle 300 using the digital key.

Figure 4:
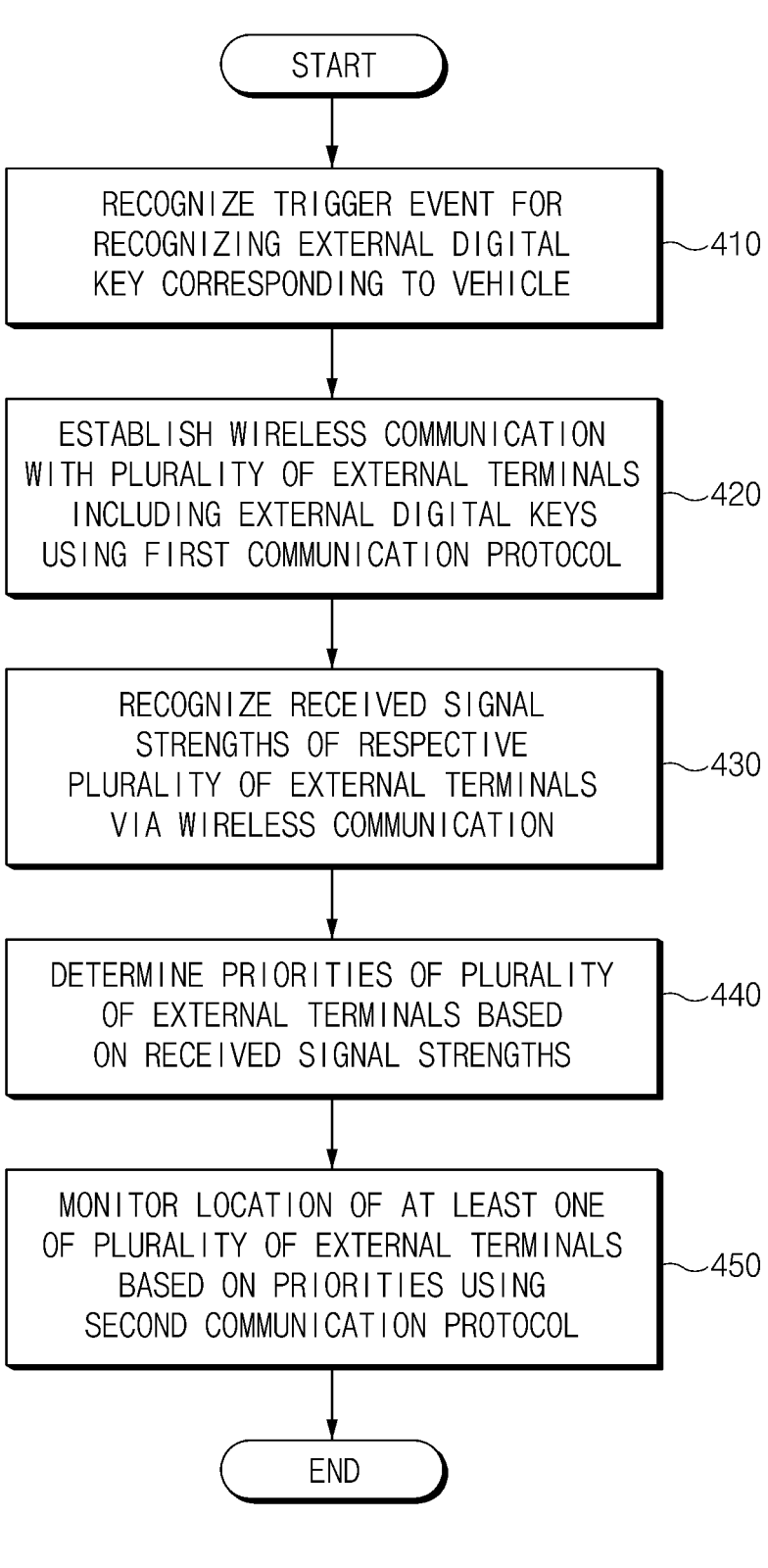
FIG. 4 is a flowchart of a digital key recognition method according to an embodiment of the present disclosure.

Hereinafter, with reference to FIG. 4, a digital key recognition method according to an embodiment of the present disclosure will be described in detail. FIG. 4 is a flowchart of a digital key recognition method according to an embodiment of the present disclosure.

Hereinafter, it is assumed that the vehicle control device 100 in FIG. 1 performs a process in FIG. 4. In addition, in a description of FIG. 4, an operation described as being performed by the device may be understood as being controlled by the processor 130 of the vehicle control device 100.

According to one embodiment, in operation 410, the vehicle control device may recognize the trigger event for recognizing the external digital key corresponding to the vehicle. According to one embodiment, the trigger event may include the at least one specified user manipulation of the vehicle. For example, the specified user manipulation may include at least one of the user's manipulation of the handle of at least one of the doors of the vehicle, the manipulation related to the trunk of the vehicle (e.g., the input to the button to open the trunk), or the manipulation of opening/closing at least one of the doors of the vehicle (e.g., opening or closing the vehicle door). According to various embodiments, the trigger event may not be limited to those listed above and may be variously specified as at least one of the user's manipulations related to the vehicle.

According to one embodiment, in operation 420, the vehicle control device may establish the wireless communication with the plurality of external terminals including the external digital keys using the first communication protocol. For example, the first communication protocol may include the Bluetooth or the Bluetooth low energy (BLE). According to one embodiment, each of the external terminals may include the digital key corresponding to the vehicle. For example, the external terminal may receive the digital key corresponding to the vehicle from the outside via the user authentication and/or the vehicle authentication. The digital key may perform the function of the smart key of the vehicle. For example, the digital key may turn on or turn off the vehicle, control the door or the window of the vehicle, or control the functions supported by the vehicle.

According to one embodiment, the vehicle control device may recognize the external terminal existing within the specified distance from the vehicle using the first communication protocol. For example, the vehicle control device may transmit/receive the signal for establishing the communication with the recognized external terminal.

According to one embodiment, in operation 430, the vehicle control device may recognize the received signal strengths of the respective plurality of external terminals via the wireless communication. For example, the vehicle control device may measure the received signal strength indicator (RSSI) for each of the plurality of external terminals.

According to one embodiment, in operation 440, the vehicle control device may determine the respective priorities of the plurality of external terminals based on the received signal strengths. For example, the vehicle control device may determine the respective priorities of the external terminals in the descending order of the received signal strengths. For example, the vehicle control device may determine the relative distance of each of the plurality of external terminals to the vehicle based on the received signal strength. The vehicle control device may set the respective priorities in the ascending order of the relative distances of the plurality of external terminals to the vehicle.

According to one embodiment, the vehicle control device may receive the request for the digital key recognition from one of the plurality of external terminals. For example, in response to the request, the vehicle control device may set the highest priority to the terminal that has sent the request. For example, when the specific terminal first transmits the request to the vehicle control device, the vehicle control device may determine that the user has the intention to control the vehicle using the digital key included in the corresponding terminal. For example, when receiving the signal including the ranging intent from the terminal including the specific digital key, the vehicle control device may set the highest priority to the corresponding terminal.

According to one embodiment, the vehicle control device may recognize the location where the trigger event has occurred. The vehicle control device may assign the weight to the received signal strength for each of the plurality of external terminals based on the distance between each of the plurality of external terminals and the location where the trigger event has occurred. For example, as the distance between the location where the trigger event has occurred and the terminal is smaller, the vehicle control device may assign the higher weight to the received signal strength for the corresponding terminal. For example, when the trigger event of pressing the trunk open button of the vehicle occurs, the vehicle control device may assign the higher weight to the terminal located close to the trunk of the vehicle. As another example, when the trigger event of pressing the driver's seat door button of the vehicle occurs, the processor 130 may assign the higher weight to the terminal located close to the driver's seat door of the vehicle. According to various embodiments, the weight value based on the distance may be preset or specified by the user input.

According to one embodiment, when the vehicle control device includes the first communication module and the second communication module disposed at the different locations of the vehicle and respectively having the predetermined cover areas containing at least the portions of the vehicle, the vehicle control device may recognize the communication module located closer to the location where the trigger event has occurred. The vehicle control device may assign the weight to the received signal strength value of the at least one terminal existing in the cover area corresponding to the communication module located closer to the location where the trigger event has occurred. According to various embodiments, the weight value based on the cover area may be preset or specified by the user input, and may be set to the different value for each type of vehicle. According to one embodiment, the vehicle control device may recognize the distance between the communication module located closer to the location where the trigger event has occurred and each of the plurality of external terminals, and assign the weights to the received signal strengths of at least some of the external terminals based on the distance between the communication module located closer to the location where the trigger event has occurred and each of the external terminals.

According to one embodiment, the vehicle control device may determine the respective priorities of the external terminals based on the received signal strength values of the respective external terminals to which the weights are assigned.

According to one embodiment, in operation 450, the vehicle control device may monitor the location of the at least one of the plurality of external terminals based on the respective priorities using the second communication protocol. For example, the vehicle control device may measure the locations of all or at least one of the plurality of external terminals in real time based on the determined respective priorities. For example, the second communication protocol may include the ultra wide band (UWB). For example, the vehicle control device may measure (e.g., perform the ranging or the localizing) the location of the at least one external terminal in real time via the UWB. For example, as the vehicle control device measures the location of the external terminal including the digital key in real time, the passive control of the vehicle via the digital key may be possible. For example, the passive control may mean the function of allowing the vehicle to determine the location of the key and perform the specified operation depending on the circumference even when the user does not directly manipulate the key of the vehicle (e.g., the terminal including the smart key and/or the digital key).

According to one embodiment, the vehicle control device may receive the control signal related to the vehicle from the external terminal at least partially based on the location of the monitored terminal. For example, the control signal may include the command for controlling the function or the operation of the vehicle. The vehicle control device may control the vehicle to perform the specified operation or function corresponding to the control signal based on the control signal. According to one embodiment, the vehicle control device may receive the control signal related to the vehicle from the external terminal via the first communication protocol (e.g., the BLE), and simultaneously, monitor the location of the external terminal via the second communication protocol (e.g., the UWB).

According to various embodiments, at least some of the operations shown in FIG. 4 may be changed in order or performed simultaneously, and at least one operation may be omitted or added. For example, after the vehicle control device establishes the wireless communication with the external terminals using the first communication protocol in operation 420, the recognizing the trigger event in operation 410 may be performed.

Figure 5:
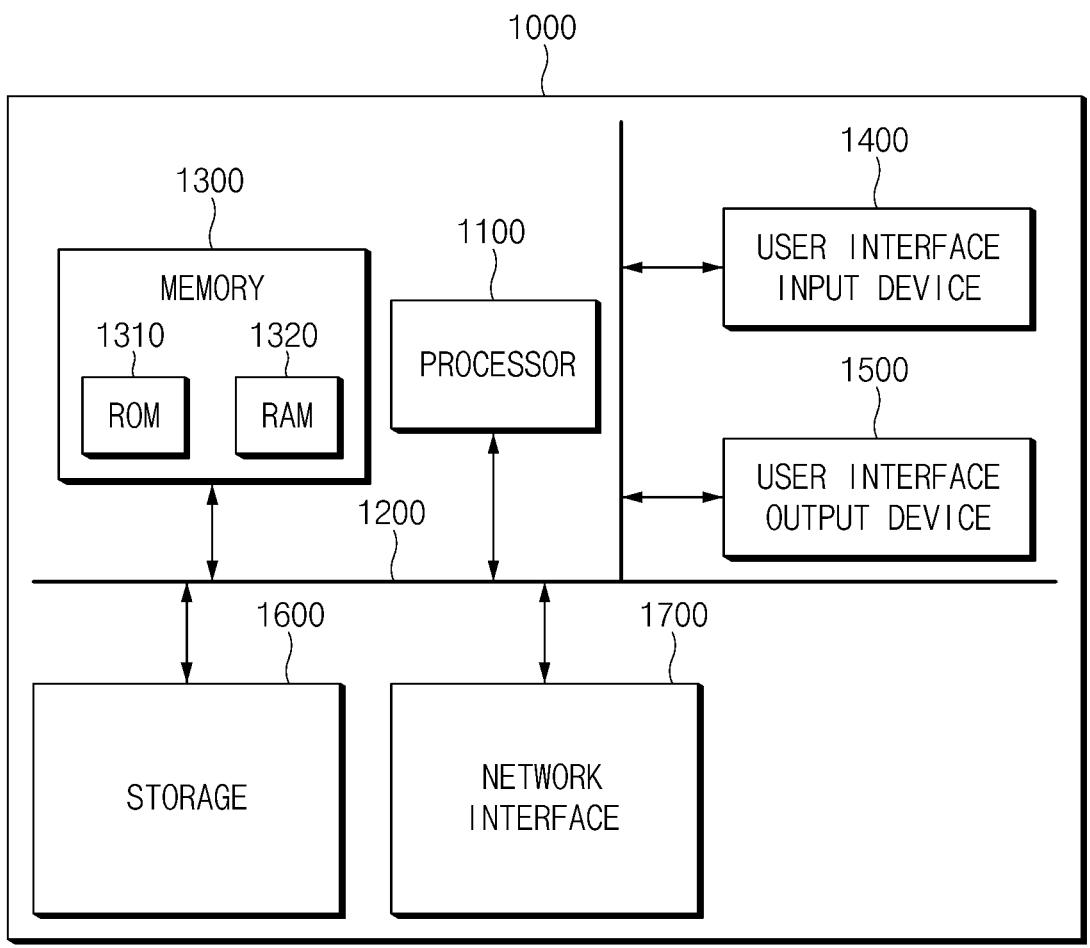
FIG. 5 is a schematic diagram of a computing system according to an embodiment of the present disclosure.

FIG. 5 is a schematic diagram of a computing system according to an embodiment of the present disclosure.

Referring to FIG. 5, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device for controlling the vehicle and the method for recognizing the digital key thereof according to various embodiments of the present disclosure may set the respective priorities for the plurality of digital keys and monitor the locations of the digital keys based on the respective priorities.

The device for controlling the vehicle and the method for recognizing the digital key thereof according to various embodiments of the present disclosure may reduce the delay of the vehicle control operation by determining the respective priorities for the plurality of digital keys depending on the circumference and monitoring the locations thereof.

The device for controlling the vehicle and the method for recognizing the digital key thereof according to various embodiments of the present disclosure may monitor the locations of the digital keys starting from the digital key likely to be used for the vehicle control by determining the respective priorities for measuring the locations of the digital keys based on the received signal strengths of the digital keys.

In addition, various effects identified directly or indirectly through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle, the device comprising:
   a communication circuit, wherein the communication circuit includes a first communication module and a second communication module at different locations of the vehicle, and the first communication module and the second communication modules have predetermined cover areas covering at least portions of the vehicle;
   a processor; and
   a memory,
   wherein the processor is configured to:
      recognize a trigger event for recognizing an external digital key corresponding to the vehicle;
      establish wireless communication with a plurality of external terminals including the external digital key via the communication circuit using a first communication protocol;
      recognize a received signal strength for each of the plurality of external terminals via the wireless communication;
      determine respective priorities of the plurality of external terminals based on the received signal strengths;
      monitor a location of at least one of the plurality of external terminals based on the respective priorities using a second communication protocol via the communication circuit;
      recognize a communication module located at a location closer to a location where the trigger event has occurred among the first communication module and the second communication module; and
      assign a weight to a received signal strength of a terminal existing in a cover area corresponding to the communication module at the closer location.

2. The device of claim 1, wherein the first communication protocol includes Bluetooth or Bluetooth low energy (BLE), and
   wherein the second communication protocol includes ultra-wideband (UWB).

3. The device of claim 1, wherein the processor is configured to:
   determine a relative distance of each of the plurality of external terminals to the vehicle based on the received signal strengths; and
   set the respective priorities in an ascending order of the relative distances of the plurality of external terminals to the vehicle.

4. The device of claim 1, wherein the trigger event includes at least one specified user manipulation of the vehicle including at least one of a user's manipulation of a handle of at least one door of the vehicle, a manipulation related to a trunk of the vehicle, or an opening/closing manipulation of at least one door of the vehicle.

5. The device of claim 1, wherein the processor is configured to:
   recognize a location where the trigger event has occurred; and
   assign a weight to the received signal strength for each of the plurality of external terminals based on a distance between each of the plurality of external terminals and the location where the trigger event has occurred.

6. The device of claim 1, wherein the weight is set to a different value for each type of vehicle.

7. The device of claim 1, wherein the processor is configured to:

receive a control signal related to the vehicle from at least one of the plurality of external terminals using the first communication protocol; and control the vehicle to perform a specified operation based on the control signal.

8. A vehicle comprising the device of claim 1.

9. A method for recognizing a digital key of a vehicle control device, the method comprising:

recognizing, by a processor, a trigger event for recognizing an external digital key corresponding to the vehicle;

establishing, by the processor, wireless communication with a plurality of external terminals including the external digital key using a first communication protocol;

recognizing, by the processor, a received signal strength for each of the plurality of external terminals via the wireless communication;

determining, by the processor, respective priorities of the plurality of external terminals based on the received signal strengths; and monitoring, by the processor, a location of at least one of the plurality of external terminals based on the respective priorities using a second communication protocol, wherein determining the respective priorities includes:

recognizing a communication module located at a location closer to a location where the trigger event has occurred among a first communication module and a second communication module located at different locations of the vehicle and respectively having predetermined cover areas covering at least portions of the vehicle; and assigning a weight to a received signal strength of a terminal existing in a cover area corresponding to the communication module at the closer location.

10. The method of claim 9, wherein the first communication protocol includes Bluetooth or Bluetooth low energy (BLE), and the second communication protocol includes ultra-wideband (UWB).

11. The method of claim 9, wherein the determining of the respective priorities includes:

determining a relative distance of each of the plurality of external terminals to the vehicle based on the received signal strengths; and setting the respective priorities in an ascending order of the relative distances of the plurality of external terminals to the vehicle.

12. The method of claim 9, wherein the trigger event includes at least one specified user manipulation of the vehicle.

13. The method of claim 12, wherein the specified user manipulation includes at least one of a user's manipulation of a handle of at least one door of the vehicle, a manipulation related to a trunk of the vehicle, or an opening/closing manipulation of at least one door of the vehicle.

14. The method of claim 9, wherein the determining of the respective priorities includes:

recognizing a location where the trigger event has occurred; and assigning a weight to the received signal strength for each of the plurality of external terminals based on a distance between each of the plurality of external terminals and the location where the trigger event has occurred.

15. The method of claim 9, wherein the weight is set to a different value for each type of vehicle.

16. The method of claim 9, further comprising:

receiving a control signal related to the vehicle from at least one of the plurality of external terminals using the first communication protocol; and controlling the vehicle to perform a specified operation based on the control signal.

\*    \*    \*    \*    \*